UNITED STATES PATENT OFFICE.

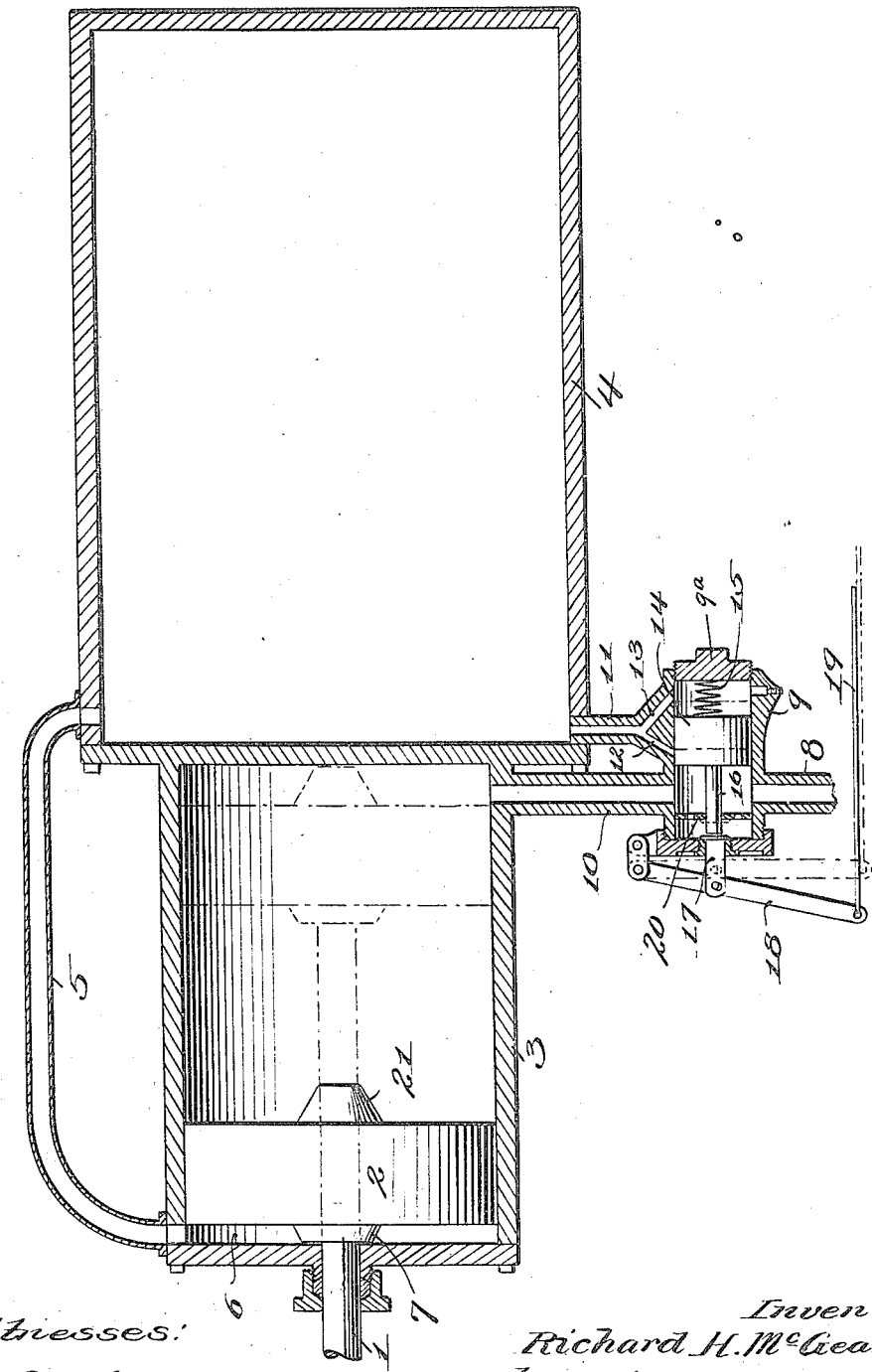

RICHARD H. McGEARY, OF ALLEGHENY, PENNSYLVANIA.

FLUID-PRESSURE BRAKE.

1,269,472.  Specification of Letters Patent.  Patented June 11, 1918.

Application filed January 8, 1915. Serial No. 1,185.

*To all whom it may concern:*

Be it known that I, RICHARD H. McGEARY, a citizen of the United States, residing at Allegheny, in the county of Allegheny and State of Pennsylvania, have invented new and useful Improvements in Fluid-Pressure Brakes, of which the following is a specification.

This invention relates to improvements in fluid pressure brakes and its principal object is to provide for the constant availability of the full braking power, at the same time permitting the braking force to be graduated in ordinary service as may be desired from zero to maximum or vice versa or from any intermediate pressure to any extreme. In furtherance of this object, the invention proposes a construction wherein fluid under sufficient pressure to develop the full braking powers is at all times kept in reserve and is effectively prevented from waste or leakage.

The invention consists generally in the combination with the brake cylinder of a storage reservoir connected to said cylinder in such manner that the fluid contained in said cylinder will, when released, operate the piston to set the brakes, a connection leading from the train line to communicate both with the brake cylinder and with the reservoir and an automatically acting valve interposed in the connection and normally operative to interrupt the communication of said connection and the reservoir.

An embodiment of the invention is illustrated in the accompanying drawing which consists of a single figure, showing in longitudinal section, a fluid pressure brake structure in which the features of the invention are incorporated.

The brake shoes (not shown) are operatively connected to the rod 1 of brake piston 2 and are set consequent to a movement of the piston 2 in a determined direction. The piston 2 works in a brake cylinder 3 and the rod 1 projects through the outer head of said cylinder. In the embodiment shown, the brake shoes are set by a movement of the piston 2 from left to right. The operative movement of the piston is produced by the compressed air stored in the reservoir 4, which preferably adjoins one end of the cylinder 3 and is connected to said cylinder by a pipe 5, the pipe 5 communicating with the space 6 between the piston 2 and the outer head of the cylinder 3. The piston 2 is prevented from cutting off the communication of the pipe 5 and the cylinder 3 by the provision of a boss 7 which engages against the end head of the cylinder and prevents the movement of the piston 2 against said end head and across the opening through which the pipe 5 communicates with the cylinder.

The reservoir 4 and the cylinder 3 are both supplied with pressure from the usual train line (not shown) by means of a connection 8 leading from said train line. The connection 8 communicates with a valve chamber 9 and the valve chamber 9 communicates on the one hand with the cylinder 3 by a pipe 10 forming, in effect, an axial continuation of the pipe 8 and on the other hand with the reservoir 4 by a pipe 11. The valve chamber 9 is provided with ducts 12 and 13 both of which communicate with the pipe 11. A piston valve 14 operates longitudinally of the chamber 9 and is acted on at one side thereof, at its right side in the embodiment shown, by a relatively weak expansive coil spring 15. The coil spring 15 is disposed in the right-hand side of the chamber 9 between the adjustable or screw-threaded head $9^a$ of the chamber or valve cylinder 9 and the piston 14, and is adapted to act against the piston to close the duct 12. The tension of the spring may be adjusted by the manipulation of said screw-threaded head $9^a$. In order to operate the valve 14 manually against the tension of the spring 15, said valve is provided at its side opposite the spring 15 with an axially projecting stem 16 which is arranged in the path of a push button 17 fitted in an adjoining head of the chamber 9. The push button 17 is in turn operated by a lever 18 to which is connected a pull cord 19. The stem 16 passes through a perforated guide plate 20.

In the normal relation of the parts, the brake piston 2, in the embodiment shown, occupies a position at the left end of the cylinder 3 and the piston valve 14 occupies a position wherein it cuts off the communication of the pipe 11 with the pipe 8. The communication of the pipes 8 and 10 is constant and is not affected by any movement of the piston valve 14.

The operation is as follows:

When the brakes are set, the brake piston 2 occupies a position at the right end of the cylinder 3, as shown by dotted lines, but does not extend across the end of the pipe 10, its movement to such extent being prevented by a boss 21 which engages the inner head of the cylinder 3. When this relation obtains, compressed air from the train pipe is admitted into the connection 8 and flows through said connection into the cylinder 3. When the pressure in the valve chamber 9, pipe 10 and cylinder 3 commences to accumulate, the piston valve 14 is forced from the position indicated in full lines, toward the right end of the chamber 9, to the position indicated in dotted lines, and in such latter position, uncovers the duct 12. At such time, the compressed air flowing into the chamber 9 through the connection 8 passes in part into the reservoir 4 and through the pipe 5 into the left end of chamber 3, specifically into the space 6 of said chamber 3. At the time that the determined degree of pressure has been charged, the pressure will be equal in degree on both faces of the piston valve 14, the duct 13 providing for this, and said piston valve thereupon will be forced to the left until it resumes its normal position, shown in full lines, and projects across the duct 12 to cut off the communication through the chamber 9 of the pipes 8 and 11. This movement of the piston valve 14 is effected by the expansion of the spring 15, when the pressures on opposite sides of the piston are equalized. At about the time when the pressures on the opposite faces of the brake piston 2 equalize, the piston 2 will be gradually forced from the position, shown in dotted lines, at the right end of the cylinder 3 to its normal position, shown in full lines, at the left end of said cylinder. This result takes place because the pressure surface is less by the area of the piston rod on the left side of the piston 2 than it is on the right side. The only port through which air can escape from the reservoir 4 is the port 12 and this port is normally closed by the valve 14. The only time that the port 12 is opened by the valve 14 is when the pressure is being charged through the connection 8. It follows that the reservoir 4 will always contain sufficient pressure to develop the full braking power, the pressure in said reservoir and in the pipe 5 serving as a resilient spring, always ready to act instantaneously when the pressure is, by any means, reduced in the train pipe and in the pipe 8, chamber 9 and the pipe 10. At the time that the pressure of air is reduced in the parts 8, 9, and 10, air will escape proportionately from that part of the cylinder 3 which is at the right of the piston 2 and the air will expand into that part of the cylinder 3 which is at the left of the piston 2, forcing said piston to the right into the position indicated by dotted lines, and thereby setting the brakes and holding them set until sufficient pressure has been restored to the brake cylinder 3 through the pipe 10 to effect the movement of the piston 2 to the left and to recompress the expanded air from the piston rod side of said piston back through the pipe 5 and into the storage reservoir 4.

When necessary, the compressed air may be released from the reservoir 4 by operating the lever 18, a movement of said lever to the position thereof shown in dotted lines causing a movement of the piston valve 14 toward the right end of the valve chamber 9 whereby it uncovers the duct 12. At such time, the air in the reservoir 4 will discharge into the valve chamber 9 to equalize the pressure in the cylinder 3, or it may by suitable simultaneous manipulation of the engineer's valve or an angle cock (neither of which are shown herein) be allowed to escape through the pipe 8 and train pipe to the atmosphere. Since the lever 18 affords the only means by which the pressure may be withdrawn from the reservoir 4, it follows that the braking pressure once obtained, cannot be destroyed or wasted, while the train is running, by an inexperienced or nervous operator. As the only means of releasing the brakes is by restoring the original pressure to the train line, and as no leakage grooves are needed or provided, the reserve pressure in the storage reservoir will be maintained indefinitely.

Having fully described my invention, I claim:—

1. In a fluid pressure brake, in combination, a brake cylinder, a brake piston in said cylinder having varying pressure surfaces on opposite sides thereof, a pressure supply pipe leading from the train line and in constant open communication with said cylinder to maintain a normal supply of fluid under pressure at the side of the piston having the greater pressure surface, a pressure reservoir in constant open communication with the cylinder to supply fluid under pressure to the side of the piston having the lesser pressure surface, a connection between said supply pipe and reservoir, a valve in said connection to normally close the same and means effective when the pressure in the reservoir and supply pipe is equalized to maintain said valve in closed position, said valve being pressure operated to open said connection when the pressure in the supply pipe temporarily exceeds the pressure in the reservoir.

2. In a fluid pressure brake, a brake cylinder, a brake piston in said cylinder and having a rod projecting therefrom and through one end of the cylinder, thereby providing varying pressure surfaces on opposite sides of the piston, a fluid pressure storage reservoir connected to the cylinder to supply fluid under pressure to the rod side of the piston, a supply pipe leading from the train line and in constant open communication with the cylinder to supply fluid under pressure to the opposite side of the piston, a connection between said supply pipe and said reservoir, said brake piston being moved against the reservoir pressure when fluid under pressure is supplied to said cylinder from the supply pipe and being moved by the reservoir pressure when the supply pipe pressure is reduced, a chamber interposed in said last mentioned connection, a piston valve in said chamber to normally close said connection, the piston valve being movable by pressure in the supply pipe when such pressure exceeds the pressure in the reservoir to open said connection between the supply pipe and the reservoir and means for automatically effecting and maintaining the operation of said piston valve to close said connection when there is an equalization of storage pressure in said reservoir and of the supply pipe pressure.

3. In a fluid pressure brake, a brake cylinder, a brake piston in said cylinder and having a rod projecting therefrom and through one end of the cylinder, thereby providing varying pressure surfaces on opposite sides of the piston, a fluid pressure storage reservoir connected to the cylinder to supply fluid under pressure to the rod side of the piston, a supply pipe leading from the train line and in constant open communication with the cylinder to supply fluid under pressure to the opposite side of the piston, a connection between said supply pipe and said reservoir, said brake piston being moved against the reservoir pressure when fluid under pressure is supplied to said cylinder from the supply pipe and being moved by the reservoir pressure when the supply pipe pressure is reduced, a chamber interposed in said last mentioned connection, a piston valve in said chamber to normally close said connection, the piston valve being movable by pressure in the supply pipe when such pressure exceeds the pressure in the reservoir to open said connection between the supply pipe and the reservoir, means for automatically effecting and maintaining the operation of said piston valve to close said connection when there is an equalization of storage pressure in said reservoir and of the supply pipe pressure, and a manually operated means for moving said piston valve to open said connection.

4. In a fluid pressure brake, a brake cylinder, a piston in said cylinder having varying pressure surfaces on opposite sides thereof, a pressure supply pipe connected to said cylinder to supply fluid under pressure to the side of the piston having the greater pressure surface, a pressure reservoir connected to the cylinder to supply fluid under pressure to the side of the piston having the lesser pressure surface, a valve cylinder interposed in said supply pipe, a connection between said valve cylinder and reservoir, a piston valve disposed in said valve cylinder adapted to normally close said last mentioned connection, said piston valve being movable by pressure in the supply pipe when such pressure exceeds the pressure in the reservoir to open said connection, a cap to close one end of said valve cylinder, a spring interposed between the valve and said cap to move the valve to close said connection when the pressures in said reservoir and supply pipe are equalized, and a slidable manually operative rod extending into said valve cylinder and engageable with the valve to move the latter to open the connection between the supply pipe and the reservoir.

5. In a fluid pressure brake, in combination, a brake cylinder, a brake piston therein having varying pressure surfaces, a reservoir for fluid under pressure, communicating with said cylinder to supply fluid adjacent the side of said piston having the lesser surface, a supply pipe leading from the train line and in constant open communication with said cylinder to supply fluid adjacent the opposite side of said piston, a connection between said supply pipe and reservoir, a valve operating in said connection and normally closing the communication of said supply pipe and said reservoir, said valve having opposite equal pressure surfaces, one of which is constantly subject to the pressure in the supply pipe and the other of which is constantly subject to the pressure in the reservoir and a spring for effecting and maintaining the closure of said valve when the fluid pressures on its opposite surfaces are equal.

6. In a fluid pressure brake, in combination, a brake cylinder, a brake piston therein having varying pressure surfaces, a reservoir for fluid under pressure, communicating with said cylinder to supply fluid adjacent the side of said piston having the lesser surface, a supply pipe leading from the train line and in constant open communication with the cylinder to supply fluid under pressure adjacent the opposite side of said piston, a connection between the supply pipe and the reservoir, a valve operating in said connection and having opposite surfaces subject to the pressures in said supply pipe and reservoir, means for automatically effecting and maintaining the closure of said valve when the pressures in the supply pipe and reservoir are equal, thereby to normally interrupt the communication of the supply pipe and the reservoir and manually operated means for opening said valve.

In testimony whereof I have hereunto set my hand in presence of two subscribing witnesses.

RICHARD H. McGEARY.

Witnesses:
A. MEDELIUS,
LUTHER K. ZABRISKIE.